US008009558B2

(12) United States Patent
Ward et al.

(10) Patent No.: US 8,009,558 B2
(45) Date of Patent: Aug. 30, 2011

(54) PSEUDOWIRE LOAD BALANCING

(75) Inventors: David D. Ward, Somerset, WI (US);
Luca Martini, Lakewood, CO (US); Jim Guichard, New Boston, NH (US)

(73) Assignee: Cisco Technology, Inc., San Jose, CA (US)

( * ) Notice: Subject to any disclaimer, the term of this patent is extended or adjusted under 35 U.S.C. 154(b) by 264 days.

(21) Appl. No.: 11/786,506

(22) Filed: Apr. 12, 2007

(65) Prior Publication Data
US 2008/0253381 A1  Oct. 16, 2008

(51) Int. Cl.
*G01R 31/08* (2006.01)
*G06F 15/16* (2006.01)
*G06F 15/173* (2006.01)

(52) U.S. Cl. ............ 370/229; 709/227; 709/238

(58) Field of Classification Search ............ 370/231, 370/232, 229, 396; 709/227, 238
See application file for complete search history.

(56) References Cited

U.S. PATENT DOCUMENTS

| 7,417,950 | B2 | 8/2008 | Hofmeister et al. | |
|---|---|---|---|---|
| 7,580,417 | B2 * | 8/2009 | Ervin et al. | 370/397 |
| 7,643,409 | B2 * | 1/2010 | Voit et al. | 370/218 |
| 2004/0156313 | A1 * | 8/2004 | Hofmeister et al. | 370/229 |
| 2006/0047851 | A1 * | 3/2006 | Voit et al. | 709/239 |
| 2007/0030851 | A1 * | 2/2007 | Sinicrope et al. | 370/392 |
| 2008/0291921 | A1 | 11/2008 | Du et al. | |

FOREIGN PATENT DOCUMENTS

| CN | 1722726 A1 | 1/2006 |
|---|---|---|
| EP | 1770902 A1 | 4/2007 |
| WO | WO 2006/007769 A1 | 1/2006 |
| WO | WO2008/127878 A1 | 10/2008 |

OTHER PUBLICATIONS

International Preliminary Report on Patentability and Written Opinion of the International Searching Authority mailed Oct. 22, 2009 for corresponding PCT Application No. PCT/US2008/059204.
Hnatyshin and Sethi, "Reducing Load Distribution Overhead with Message Aggregation," Conference Proceedings of the 2003 IEEE, pp. 227-234.
Supplementary European Search Report in related European Application No. 08744980.7—2416/2135101 dated Mar. 3, 2010.
Supplementary European Search Report in related European Application No. 08744980.7—2416/2135101 dated Jun. 18, 2010.

* cited by examiner

*Primary Examiner* — Hassan Phillips
*Assistant Examiner* — Hicham B Foud
(74) *Attorney, Agent, or Firm* — Brinks Hofer Gilson & Lione

(57) ABSTRACT

In one embodiment, a communications distribution process maintains at least two pseudowires through a network such that the pseudowires share a burden of delivering data through the network. The communications distribution process receives feedback data concerning operation of each pseudowire. The communications distribution process utilizes the feedback data to distribute communications to the common destination across each of the pseudowires. Additionally, the communications distribution process utilizes the feedback to establish at least one new pseudowire, in addition to the first pseudowire and the second pseudowire, for transmission of data traffic.

18 Claims, 7 Drawing Sheets

PSEUDOWIRE LOAD BALANCING

FIELD OF THE INVENTION

The present disclosure relates generally to the implementation of pseudowires in a Packet Switched Network ("PSN"). The present disclosure more specifically includes the distribution of network traffic among multiple pseudowires.

BACKGROUND

Pseudowires ("PWs") are known in the art of computer networking and telecommunications to transport frames in a point-to-point manner. In general, a pseudowire is an emulation of the essential attributes of a telecommunications service over a Packet Switched Network ("PSN"). The service may be Asynchronous Transfer Mode ("ATM"), Transmission Level 1 ("T1") leased line, Frame Relay, Ethernet, low-rate Time Division Multiplexing ("TDM"), or Synchronous Optical Networking ("SONET"), for example. The PSN can have attributes associated with Multiprotocol Label Switching ("MPLS"), or Layer 2 Tunnel Protocol Version 3 ("L2TPv3"). The required functions of pseudowires include encapsulating service-specific bit streams, cells, or Protocol Data Units ("PDU") arriving at an ingress port and carrying them across an IP path or MPLS tunnel.

Pseudowires are used in many applications to transport native Layer 2 frames in a point-to-point fashion. One such application utilizes pseudowires to aggregate Layer 3 IP traffic from an access device (e.g., Multiservice Access Node "MSAN") to a point in the network that instantiates the Layer 3 services. In this manner, a pseudowire transports Layer 2 frames from an access device across a packet switched network to a Layer 3 service instantiation point (e.g., an IP router).

BRIEF DESCRIPTION OF THE DRAWINGS

The foregoing and other objects, features, and advantages of the present application will be apparent from the following more particular description of preferred embodiments of the present disclosure, as illustrated in the accompanying drawings in which like reference characters refer to the same parts throughout the different views. The drawings are not necessarily to scale, with emphasis instead being placed upon illustrating the embodiments, principles and concepts.

DETAILED DESCRIPTION OF EXAMPLE EMBODIMENTS

Figure 1:
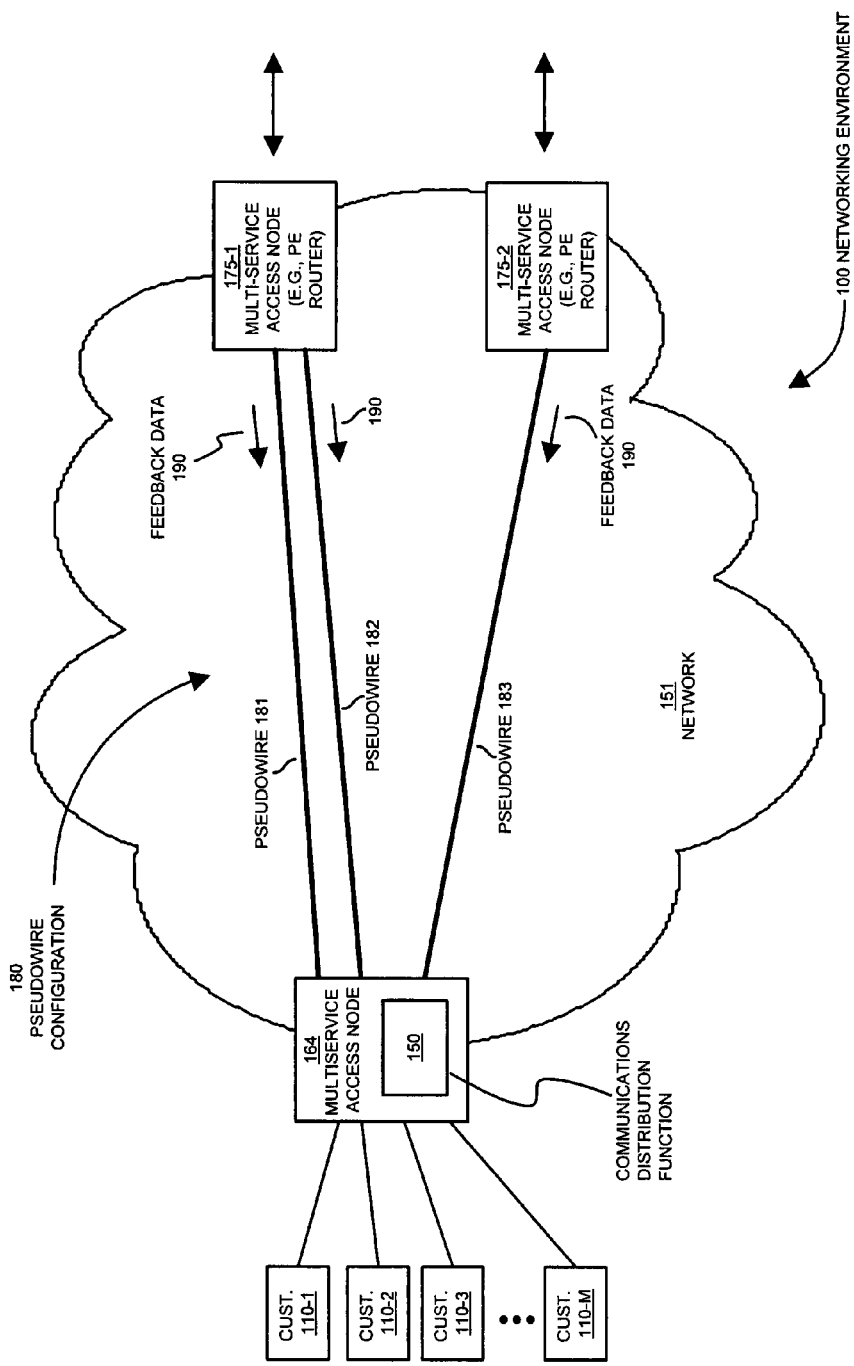
FIG. 1 is a block diagram illustrating an example network environment including multiple pseudowires according to embodiments herein.

Overview:

In a general embodiment as discussed in more detail below in this detailed description, a communications distribution process maintains two or more pseudowires through a network. The pseudowires are configured to deliver traffic flows of data through a corresponding network environment. The communications distribution process receives feedback data concerning operation of each pseudowire. Based on the feedback, the communications distribution process distributes communications (e.g., new communication sessions for each of multiple customers) across each of the pseudowires.

In one embodiment, the communications distribution process load balances communications on a per-customer basis such that the communications distribution process assigns a first set of different customers' corresponding data sessions to a first pseudowire and assigns a second set of different customers' corresponding data sessions to a second pseudowire. In other words, each customer can be limited to allocation of a single communication data session that is assigned to either the first pseudowire or the second pseudowire depending on current load conditions associated with the pseudowire and/or or layer 3 service instantiation point (e.g. IP router). Thus, the communications distribution process can load balance each new customer data session depending on availability of resources associated with the respective pseudowire and/or layer 3 service instantiation point.

These and related embodiments will be discussed in more detail below.

Detailed Description:

Generally, conventional pseudowires emulate a native Layer 2 service over a packet switched network to provide a transparent Layer 2 interface between pseudowire termination devices in the packet switched network for a single customer. Conventional pseudowire technology, however, suffers from a variety of deficiencies. In particular, only a primary pseudowire (e.g., of an active/backup pseudowire pair for a single customer) can be active at one time between a customer node and the service instantiation device (IP router) in a conventional packet switched network. As a result, according to conventional pseudowire technology, backup pseudowires remain unused until occurrence of a failure in a primary pseudowire.

Embodiments herein disclose novel ways of improving the usage of pseudowires. In one embodiment, each of multiple pseudowires actively supports data sessions for multiple customers. For example, as mentioned above, a communications distribution function operating in the multi-service access node can support load-balancing of communications (e.g., IP sessions, PPP sessions, DHCP requests, etc.) for different customers across multiple pseudowires. As previously discussed, in a specific embodiment, each customer can establish a single data session through one of the pseudowires.

In the event of a failure, the communications distribution function according to embodiments herein has the ability to immediately switch network traffic (or re-establish communications sessions) from a failing pseudowire onto at least one remaining non-failing pseudowire (if such a pseudowire is available). Accordingly, embodiments disclosed herein significantly overcome the above-mentioned deficiencies as well as other deficiencies associated with implementing conventional pseudowires.

FIG. 1 is an example block diagram that depicts a network environment 100 including a network 151 (e.g., a public and/or packet switched network) in accordance with one example embodiment. MSAN 164 is configured to receive traffic flows from customers 110 (e.g., customer 110-1, customer 110-2, customer 110-3, . . . , customer 110-M) that transmit data over one or more pseudowires in network 151.

As will be discussed in more detail below, multi-service access node 164 (or another resource in the networking environment 100) includes a communications distribution function 150 configured to perform operations such as load balancing of certain types of aggregated network traffic flows (e.g., sessions) for transmission over pseudowires 181, 182, and 183. Network 151 can be configured, for example, as a packet switched network, label switched network, etc.

Prior to creation of pseudowires in network 151, a single directed LDP (Label Distribution Protocol) session can be established between the multi-service access node (MSAN) 164 and an appropriate pseudowire termination node such as multi-service edge nodes 175-1 and 175-2 (e.g., a provider edge router associated with network 151). In one embodiment, the multi-service provider edge nodes 175 (e.g., multi-service edge node 175-1 and multi-service edge node 175-2) are configured to support layer 3 services.

After establishing the LDP session as discussed above, the multi-service access node 164 and multi-service edge nodes 175 establish corresponding pseudowires 181, 182, 183, etc. as illustrated. Accordingly, the multi-service access node 164 can be connected by two or more pseudowires to layer 3 provider edge routers (e.g., multi-service edge nodes 175). According to one example embodiment, the multi-service edge nodes 175 and multi-service access node 164 are Layer 3 provider edge routers capable of implementing a broad range of routing protocols (e.g., MPLS, etc.).

The pseudowires in network 151 can be established according to different protocols. For example, protocols such as LDP or L2TPv3 (Layer 2 Tunneling Protocol version 3), etc. can be used to setup a corresponding pseudowire to provide point-to-point tunneling. L2TPv3 is a new version of L2TP that is proposed as an alternative protocol to LDP and MPLS for encapsulation of Layer 2 communications traffic over PSNs.

FIG. 1 further depicts an example pseudowire configuration 180 between the multi-service access node 164 and multi-service edge nodes 175. For instance, a first pseudowire 181 extends from multi-service access node 164 to multi-service edge node 175-1. Likewise, a second pseudowire 182 extends from multi-service access node 164 to multi-service edge node 175-1. Furthermore, as shown in the example embodiment of FIG. 1, a third pseudowire 183 extends from multi-service access node 164 to multi-service edge node 175-2. Multi-service edge node 175-1 can physically reside at a different location than multi-service edge node 175-2.

As its name suggests, the multi-service access node 164 according to embodiments herein enables customers 110 to establish communication sessions within the pseudowires 181, 182, and 183 for transmitting data to multi-service edge node 175 for processing.

As mentioned above, each of the pseudowires as described herein can be a point-to-point connection between pairs of provider edge (PE) routers (e.g., multi-service edge nodes 175) in network 151. One function of the pseudowires is to emulate services like Ethernet over an underlying core MPLS (Multo-Protocol Label-Switching) network through encapsulation into a common MPLS format. By encapsulating services into a common MPLS format, a pseudowire allows carriers to converge their services to an MPLS network.

After establishing pseudowires 181, 182, and 183, the multi-service access node 164 allocates new traffic flows on the pseudowires on a per-customer basis. For example, the multi-service access node 164 can assign pseudowire 181 to handle a customer traffic flow associated with each of a first set of customers 110 including customer #1, customer #4, and customer #8. Additionally, the multi-service access node 164 can assign pseudowire 183 to handle a customer traffic flow associated with each of a second set of customers 110 including customer #5 and customer #7. Yet further, the multi-service access node 164 can assign pseudowire 182 to handle a customer traffic flow associated with each of a third set of customers 110 including customer #11, customer #18, customer #19, and customer #20.

As will be discussed further below, the multi-service access node 164 can assign each additional new customer traffic flow on a per-customer basis or per-session basis. Note that a customer may have one or more sessions between multi-service access node 164 and multi-service edge node 175. For example, based on a request for a new session from customer #2 (e.g., a customer that currently is not assigned to a corresponding pseudowire), the multi-service access node 164 can assign a corresponding new session for customer #2 on pseudowire 181; based on a request for a new session from customer #6, the multi-service access node 164 can assign a corresponding new session for customer #6 on pseudowire 183; and so on. Depending on load conditions, note also that the multi-service access node 164 can allocate groups of multiple new customer's sessions on each pseudowire as opposed to merely toggling assignment of new customer session between the pseudowires for each new customer session.

The decision on which of the pseudowires to assign each new customer traffic flow can depend on feedback 190. For example, one embodiment of the present disclosure includes a method to transmit, and thus receive, utilization information (e.g., feedback 190) at ingress devices such as multi-service access node 164. Multi-service edge nodes 175 can provide feedback 190 indicating load information such as current load conditions (e.g., bandwidth availability or usage) associated with each pseudowire for which it acts as a termination node, the ability of the multi-service edge node to handle new traffic flows, etc. Thus, each of the multi-service edge nodes 175 (or other monitoring devices in network 151) can measure the processing load associated with each corresponding provider edge router (e.g., an end node of the pseudowires) or pseudowire for feeding back to the multi-service access node 164.

A current utilization load (e.g., pseudowire bandwidth utilization, processing resource utilization in the termination devices, etc.) as identified by feedback 190 can be communicated across the pseudowires back to the multi-service access node 164 in the form of a load number for each service instantiation point. This load number can be used to calculate a traffic hash table in the multi-service access node 164.

Based on receipt of feedback 190, the multi-service access node 164 can make decisions on how to assign traffic flows to the pseudowires for each new requesting customer in order to reduce or prevent resource starvation in the multi-service edge node 175 that may otherwise occur if the multi-service access node 164 overloaded a single pseudowire with too many customers' traffic flows. For example, based on feedback 190, the multi-service access node 164 can reduce the amount of traffic sent to a pseudowire or termination node (e.g., a provider edge router such as multi-service edge nodes 175) that is currently overloaded with too much traffic.

There are two cases to consider for load-balancing and assignment of new customer's traffic flows to pseudowires in network 151.

1. Load-balancing Amongst Multiple Pseudowires to a Single Layer-3 Termination Node An example of this termination case is illustrated in FIG. 1 via pseudowire 181 and pseudowire 182, both of which terminate at multi-service edge node 175-1. As previously discussed, each of pseudowires 181 and 182 provide a communication path for a corresponding group of customers from multi-service access node 164 through network 151 to multi-service edge node 175-1.

In this case, assume that pseudowire 181 and pseudowire 182 have been assigned for use by a number of customers to convey traffic as discussed above. It may be desirable to consider how much load (e.g., processing resources associated with destination termination device 175-1) is currently used by each of the pseudowires 181 and 182 that terminate at the same layer-3 device (e.g., multi-service edge node 175-1) before assigning new traffic flows on the pseudowires. Feedback 190 from multi-service edge node 175-1 provides this load information.

These pseudowires 181 and 182 may or may not take different paths from the multi-service access node 164 to the layer-3 terminating device (e.g., device 175-1), but in either case, the multi-service access node 164 can apportion new traffic flows (e.g., load-balance) on a per-customer basis across the pseudowire 181 and pseudowire 182 based on current load conditions. For example, if pseudowire 181 is currently more loaded than pseudowire 182 as identified by feedback 190, the multi-service access node 164 can assign a new customer's communication session to pseudowire 182. Conversely, if pseudowire 182 is currently more loaded than pseudowire 181 as identified by feedback 190, the multi-service access node 164 can assign a new customer's communication session to pseudowire 181. Thus, the multi-service access node 164 can establish new sessions for the new customers on a selected pseudowire of multiple possible pseudowires to reduce the amount of traffic processing on each pseudowire 181 an 182 (which can be useful in the case of higher layer protocols such as PPP termination on a multi-service provider edge router device).

In such an embodiment, when the pseudowires terminate at the same end point, then all customer sessions are initiated to the same termination device and the IP addresses inside the L2 switched transported IP packets can also be used to calculate the load sharing hash Furthermore, as in a specific embodiment, only single session data will flow over a single pseudowire. In other words, customer data for a single session is not split among multiple pseudowires. Nonetheless, a customer can have several sessions such as, for example, one session for VPN, one session for the Internet, one session for a voice service, and etc. Note that each of these different customer sessions are placed individually on a single pseudowire (e.g., voice service over PW1, Internet and VPN over PW2, etc.)

Additionally, in a multi service edge box (e.g., multiservice access node 164) pseudowires can terminate in different internal processors (e.g., cards) and/or ports, according to one example embodiment. It is quite useful, therefore, to load balance among pseudowires that terminate in the same device (e.g., multiservice access node 164). As such, the methods and techniques described herein can be applied to circumstances that involve load-balancing of sessions (e.g., IP sessions, PPP sessions, etc.) among pseudowires that terminate in the same device (e.g., terminate at different processing cards and/or ports within multiservice access node 164).

2. Multiple Pseudowires to Multiple Different Layer-3 Termination Nodes

An example of this termination case is illustrated in FIG. 1 via pseudowire 181 and pseudowire 183. Each of pseudowires 181 and 183 provide a communication path from multi-service access node 164 through network 151, and terminates at multi-service edge node 175-1 and multi-service edge node 175-2, respectively.

In this case, even though pseudowires 181 and 183 may terminate on different upstream layer-3 devices (e.g., multi-service edge node 175-1 and multi-service edge node 175-2), receipt of feedback 190 from the layer-3 devices 175 enables the multi-service access node 164 to determine on which out-bound pseudowire to create each new session initiated by a corresponding customer associated with pseudowires 181 and 183.

Thus, since the pseudowire 181 and 183 do not terminate on the same L3 service PE (MSE), the multi-service access node 164 will load share amongst the pseudowires 181 and 183 on a per session basis by appropriately selecting a more desirable pseudowire (e.g., less loaded) or provider edge router on which to initiate a new session.

In one embodiment, pseudowires terminating at the same multi-service edge node 175 can be configured to provide a level of redundancy. State information associated with sessions of the failing pseudowire (e.g., pseudowire 181) is available to the non-failing pseudowire (e.g., 182). In the event of a failure on a given pseudowire (e.g., pseudowire 181), the communications distribution function 150 according to embodiments herein can be configured to immediately switch network traffic flows (or re-establish communications sessions) from a failing pseudowire (e.g., pseudowire 181) onto at least one remaining non-failing pseudowire (e.g., pseudowire 182).

Accordingly, embodiments disclosed herein include a method and system for load-balancing aggregated IP services on different pseudowires. Additional embodiments herein include a method and system for providing a level of redundancy for switching session from a failed pseudowire to a non-failing pseudowire.

Figure 2:
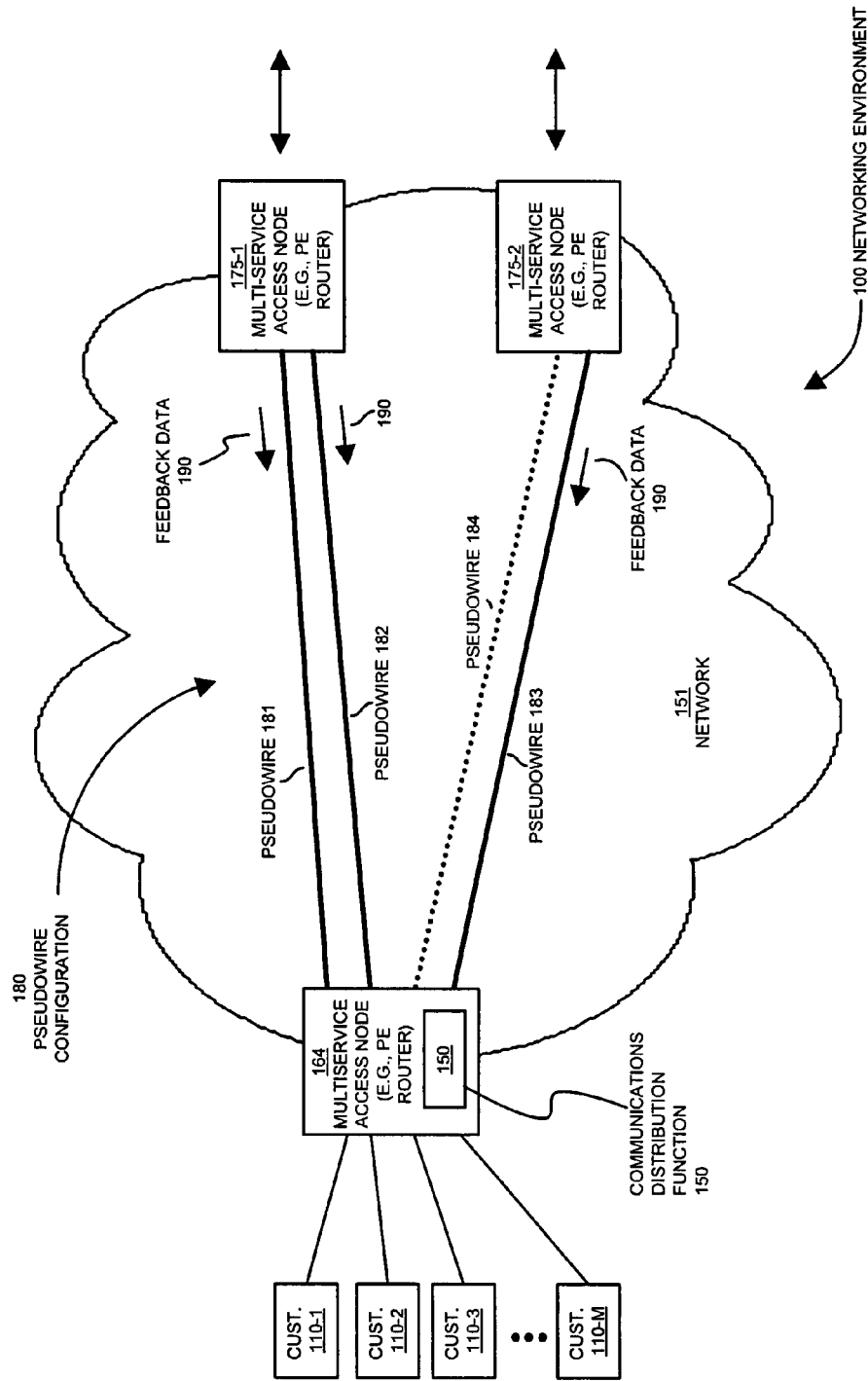
FIG. 2 is a block diagram illustrating an example network environment including multiple pseudowires according to embodiments herein.

FIG. 2 is an example diagram illustrating networking environment 100 and creation of one or more new pseudowires according to embodiments herein. The newly established pseudowire 184 produced by communications distribution function 150 enables communication between multi-service access node 164 and multi-service edge node 175-2 in a similar manner as discussed above for pseudowires 181, 182, and 183 enable communications.

In one example embodiment, as will be discussed in more detail below, the communications distribution function 150 can establish new pseudowire 184 based on receiving feedback data 190 (e.g., bandwidth capacity data, processor load data, etc.) from one or more multi-service edge nodes 175. For example, as previously discussed, multi-service edge node 175 may provide feedback 190 indicating that it is comparatively more loaded with tasks than feedback 190 provided by multi-service edge node 175-2. Given such loading conditions, when establishing a new pseudowire, multi-service access node 164 would select multi-service edge node 175-2 as a remote endpoint for terminating newly established pseudowire 184 in lieu of selecting multi-service edge node 175-1 as an endpoint.

In one embodiment, the feedback data 190 provided by the termination devices (e.g., multi-service edge nodes 175) to multi-service access node 164 can be used for dual purposes. For example, the feedback data 190 can be used to perform load-balancing of new customer traffic flows on the pseudowires as discussed above with respect to FIG. 1. As more recently discussed with respect to FIG. 2, the feedback data 190 can be used to make decisions on how to select endpoints for creation of new pseudowires in network 151.

It should be noted that in the example embodiments disclosed herein, the communications distribution function 150 can establish (or initiate the establishment of) new pseudowire connections in addition to, or in lieu of, performing load-balancing operations on network traffic as previously described. For example, if the multiservice access node 164 detects that a layer 3 provider edge router (e.g., a multi-service edge node 175) is currently receiving large amounts of network traffic or simply lacks resources to handle formation of a new pseudowire 184, the multiservice access node 164 can establish the new pseudowire 184 with another destination (e.g., multi-service edge node 175). Accordingly, embodiments herein include a method and system that enables use of feedback 190 to determine how to establish new pseudowire connections.

Figure 3:
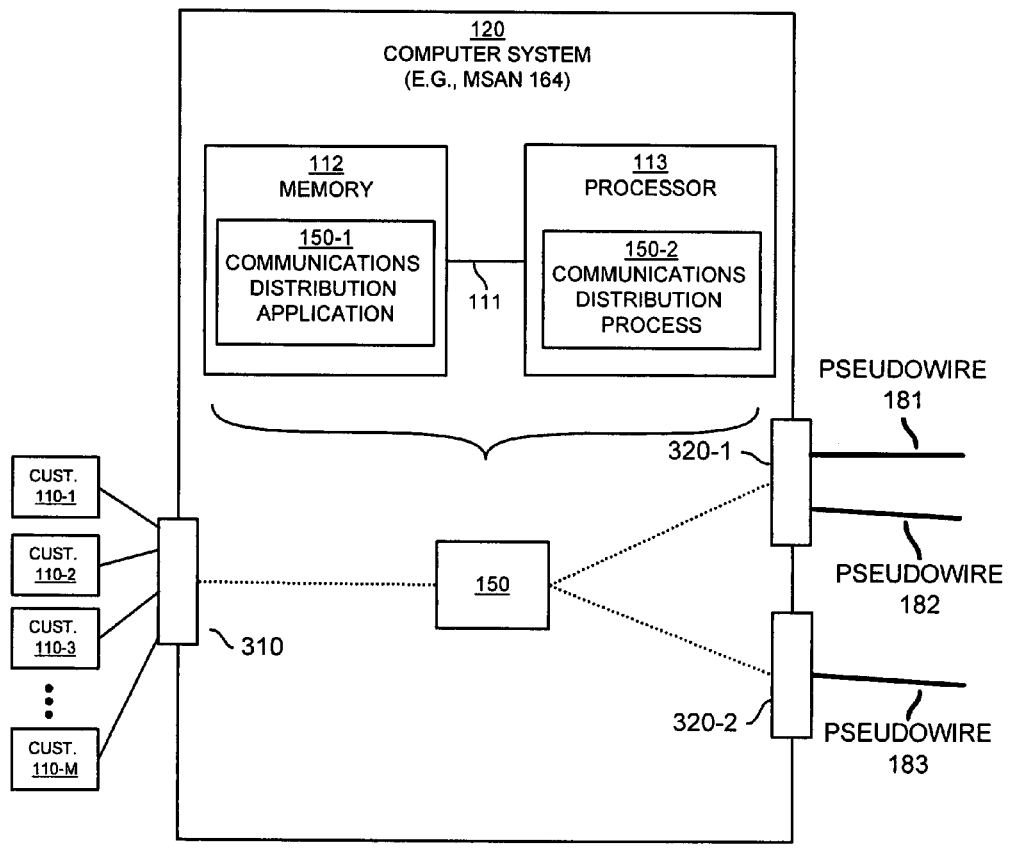
FIG. 3 is a block diagram illustrating an example computerized device system for implementing a communications distribution process according to embodiments herein.

FIG. 3 is a block diagram illustrating an example computer system 120 for implementing communications distribution function 150 and/or other related processes to carry out the different functionality as described herein. Computer system 120 can be a computerized device such as a provider edge router, multi-service edge node, hub, gateway, access point, computer, workstation, processing device, etc.

As shown, computer system 120 (e.g., multi-service access node 164) of the present example includes an interconnect 111 that couples a memory system 112, a processor 113. The computer system can include communication interface 310 to aggregate and disseminate traffic to customers 110. Computer system 120 can include communications interfaces 320-1 and 320-2 for establishing pseudowires 181, 182, and 183 and transceiving (e.g., transmitting and receiving) corresponding data traffic.

As shown, memory system 112 is encoded with communications distribution application 150-1. Communications distribution application 150-1 can be embodied as software code such as data and/or logic instructions (e.g., code stored in the memory or on another computer readable medium such as a disk) that support functionality according to different embodiments described herein.

During operation, processor 113 of computer system 120 accesses memory system 112 via the interconnect 111 in order to launch, run, execute, interpret or otherwise perform the logic instructions of the communications distribution application 150-1. Execution of communications distribution application 150-1 produces processing functionality in communications distribution process 150-2. In other words, the communications distribution process 150-2 represents one or more portions of the communications distribution application 150-1 (or the entire application) performing within or upon the processor 113 in the computer system 110.

It should be noted that, in addition to the communications distribution process 150-2, embodiments herein include the communications distribution application 150-1 itself (i.e., the un-executed or non-performing logic instructions and/or data). The communications distribution application 150-1 can be stored on a computer readable medium such as a floppy disk or hard disk. The communications distribution application 150-1 can also be stored in a memory type system such as in firmware, read only memory (ROM), or, as in this example, as executable code within the memory system 112 (e.g., within Random Access Memory or RAM).

In addition to these embodiments, it should also be noted that other embodiments herein include the execution of communications distribution application 150-1 in processor 113 as the communications distribution process 150-2. Those skilled in the art will understand that the computer system 120 can include other processes and/or software and hardware components, such as an operating system that controls allocation and use of hardware resources associated with the computer system 110.

Figure 4:
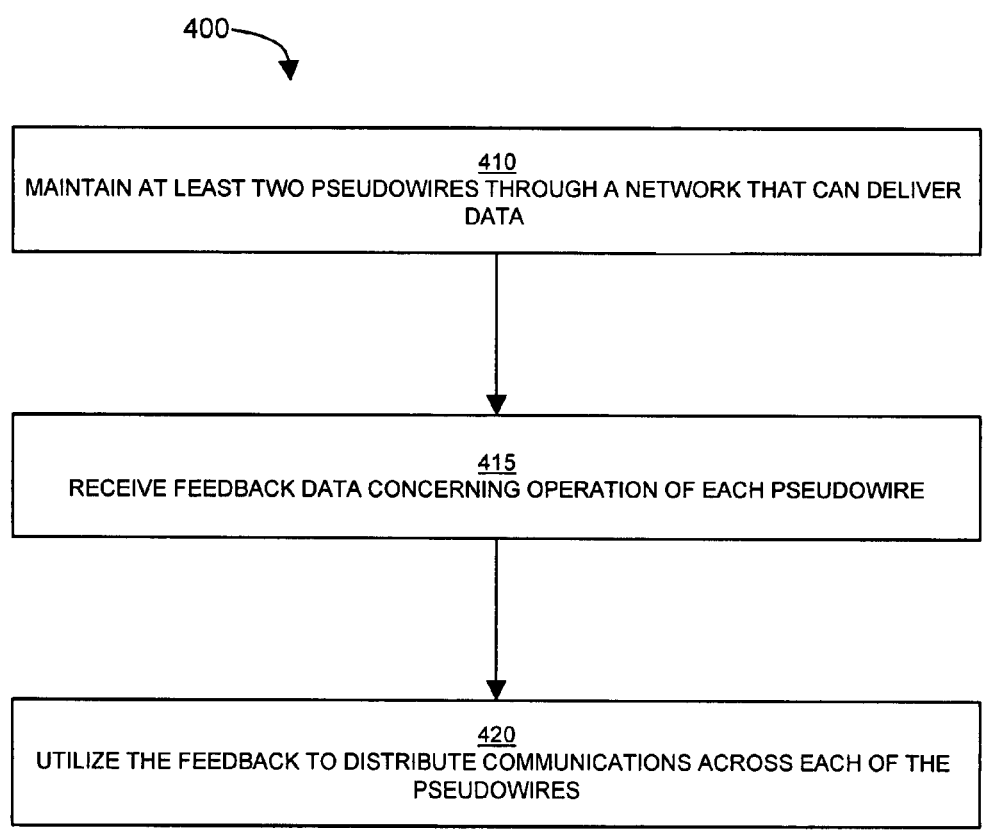
FIG. 4 is a flow chart of example processing steps performed by the communications distribution process according to embodiments herein.

FIG. 4 is a flow chart 400 of example processing steps performed by the communications distribution function 150 (or other resource in network 151 to support load-balancing and other techniques) according to embodiments herein.

In step 410, the communications distribution function 150 maintains at least two pseudowires through network 151 that can deliver data. As shown in the example embodiment of FIG. 1, communications distribution function 150 maintains pseudowires 181, 182, and 183. According to one example embodiment, the communications distribution function 150 emulates a native Layer 2 service over the network 151 to provide a substantially transparent Layer 2 interface on pseudowires 181, 182, 183, etc.

As previously discussed, the communications distribution function 150 can enable: i) Point-to-Point Protocol over Ethernet (PPPoE) communications sessions; ii) Dynamic Host Configuration Protocol (DHCP) request sessions; iii) Virtual Local Area Network (VLAN) communications sessions, and/or iv) IP sessions, etc. over the pseudowires in network 151.

In step 415, the communications distribution function 150 receives feedback data 190. The feedback data 190 can include, for example, a bandwidth parameter of a respective pseudowire, a process load parameter of a termination device (e.g., a multi-service edge node 175), a memory parameter (e.g., available memory capacity) of a termination device, etc., in order to make decisions such as: i) creation of new customer sessions on the pseudowires, and/or ii) creation of new pseudowires. In one embodiment, the communications distribution function 150 receives feedback data 190 from multi-service edge nodes 175 in a status message that is transmitted in accordance with a Label Distribution Protocol ("LDP").

In response to receiving the feedback data 190 from one or more multi-service edge nodes 175, the communications distribution function 150 can create a traffic hash table consisting of traffic related metrics (e.g., bandwidth parameters, processor load parameters, etc.) for each multi-service edge node destination. In such an embodiment, the communications distribution function 150 can utilize the traffic hash table to identify optimal network traffic distribution of new data traffic flows through the pseudowires (e.g., first pseudowire 181, second pseudowire 183, etc.).

In step 420, the communications distribution function 150 utilizes the feedback data 190 to distribute communications (e.g., new data traffic flows) through network 151. For example, as will be discussed in more detail in the steps below, there are two cases (e.g., load-balancing of new customer traffic flows on existing pseudowires and creation of new pseudowires) in which the communications distribution function 150 utilizes the feedback data 190 to manage communications in network 151.

Figure 5:
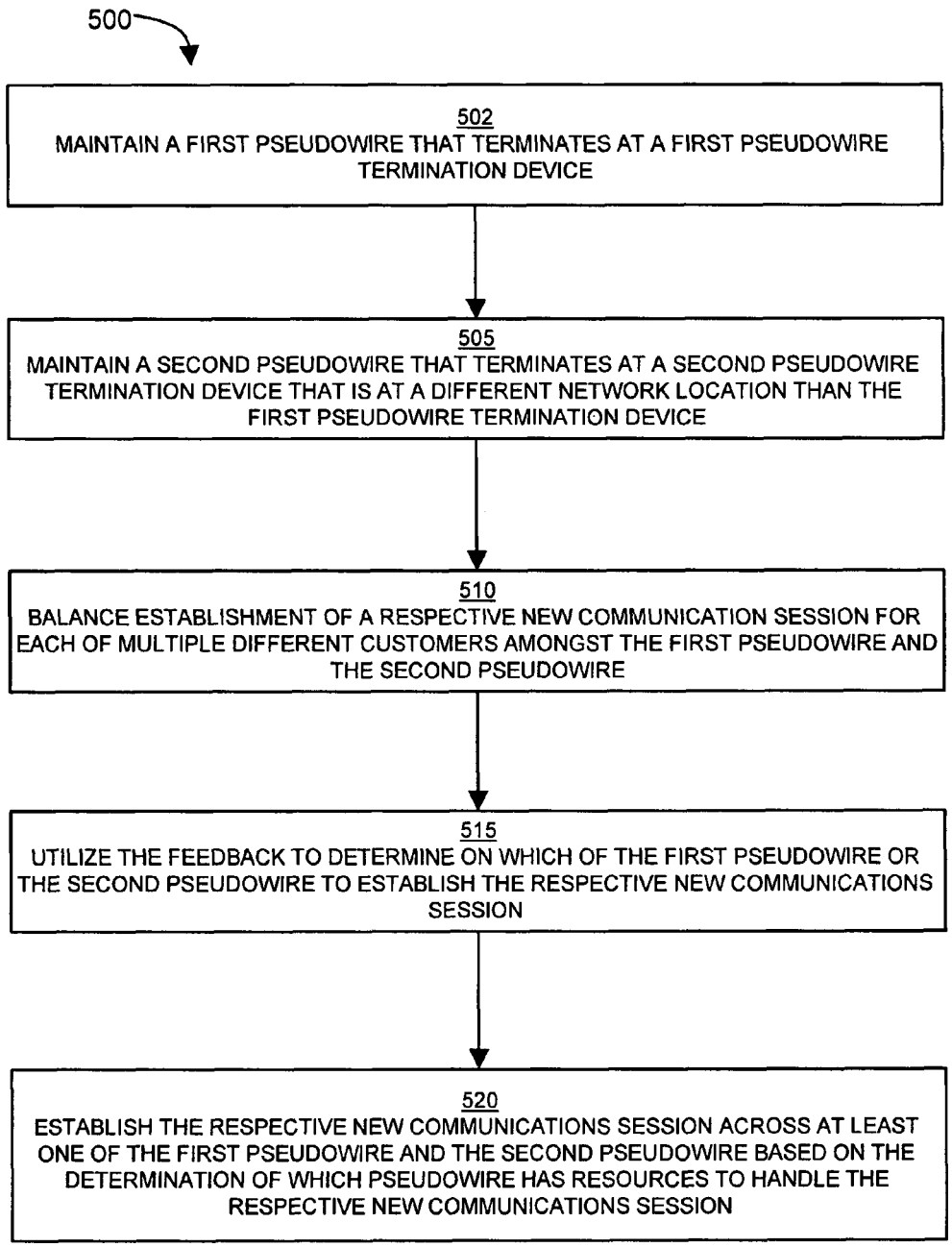
FIG. 5 is a flow chart of example processing steps performed by the communications distribution process according to embodiments herein.

FIG. 5 is a flow chart 500 of example processing steps performed by the communications distribution function 150 according to embodiments herein. The example embodiments represented by flowchart 500 illustrate a configuration of multiple pseudowires (e.g., pseudowire 181 and 183) that each terminates on a different upstream layer 3 provider edge devices (e.g., multi-service edge node 175). This is also illustrated in FIG. 1.

By receiving feedback from the Layer 3 provider edge devices, the communications distribution function 150 determines on which outbound pseudowire (and hence which multi-service edge node 175) on which to initiate a new traffic flow session. Since the pseudowires do not terminate on the same destination termination device 175, the multiservice access node 164 load-balances amongst pseudowires on a per-customer or per-session basis by appropriately selecting the least loaded layer 3 provider edge device (e.g., multi-service edge node 175) or pseudowire on which to initiate the new network session (e.g., PPPoE session, DHCP request, etc.). In other words, the multi-service access node 164 can utilize the feedback data 190 to identify on which of multiple established pseudowires to establish a new session for communicating between multi-service access node 164 and a corresponding pseudowire termination node (e.g., multi-service edge node 175) in network 151.

Now, referring to step 502 in flowchart 500 of FIG. 5, the communications distribution function 150 creates and maintains a pseudowire 181 as previously discussed.

In step 505, the communications distribution function 150 creates and maintains pseudowire 183 as previously discussed. Pseudowire termination devices (e.g., multi-service edge nodes 175) can reside at the same or different physical locations network 151.

In step 510, the communications distribution function 150 balances establishment of different communication sessions (e.g., IP sessions such as PPPoE sessions, DHCP request sessions, etc., associated with each different customer) amongst pseudowire 181 and pseudowire 183. In other words, the communications distribution function 150 balances network communications on a per-session or per-customer basis as the new sessions are established through the pseudowires 181 and 183.

In step 515, the communications distribution function 150 utilizes the feedback data 190 to determine on which of the first pseudowire 181 or the second pseudowire 183 to establish a new traffic flow.

In step 520, the communications distribution function 150 establishes the new traffic flow (e.g., PPP session) for a corresponding new customer on either pseudowire 181 or pseudowire 183 based on the determination of which pseudowire has more available resources to handle the new communications session for the new customer.

For example, in one embodiment the communications distribution function 150 can use feedback data 190 (e.g., processor load data) to determine that multi-service edge node 175-2 (and thus second pseudowire 183) has a more suitable processor load capacity metric in relation to the multi-service edge node 175-1 for the establishment of a new PPP session. As a result, the communications distribution function 150 establishes the new PPP session to the multi-service edge node 175-2 via second pseudowire 183 since the multi-service edge node 175-2 has the more suitable feedback metric.

Figure 6:
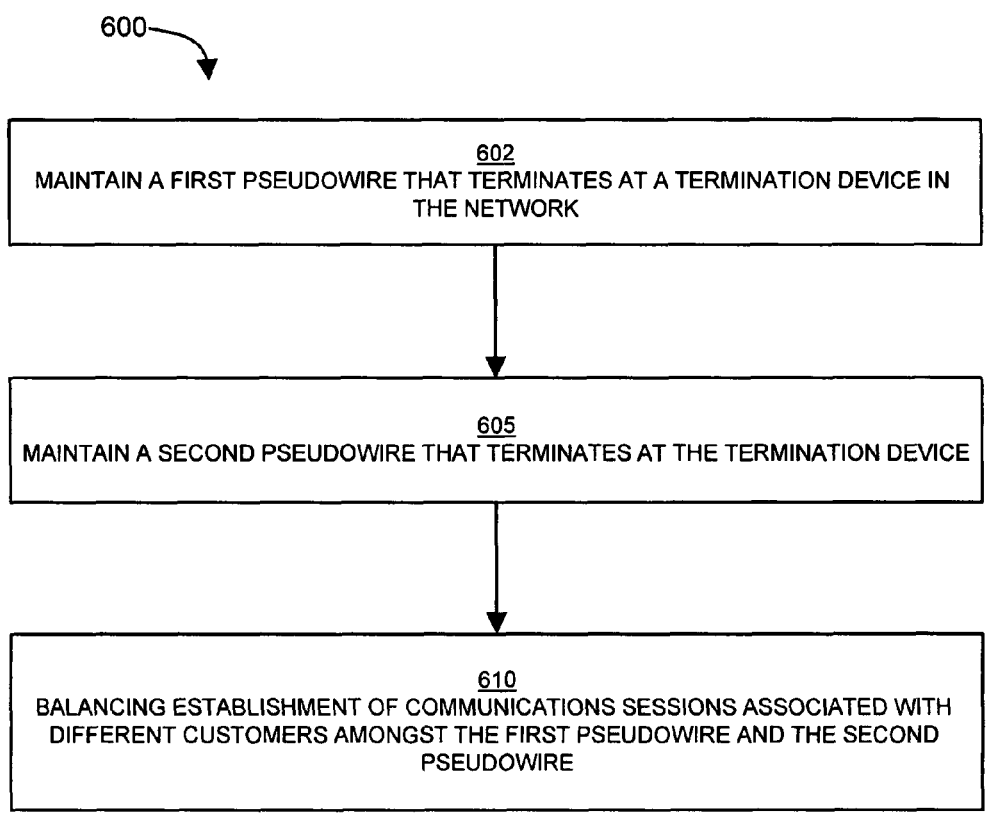
FIG. 6 is a flow chart of example processing steps performed by the communications distribution process according to embodiments herein.

FIG. 6 is a flow chart 600 of example processing steps performed by the communications distribution function 150 according to embodiments herein. Note that the flowchart 600 will again refer to the embodiment discussed with respect to FIG. 1.

In step 602, the communications distribution function 150 maintains pseudowire 181 that terminates at multi-service edge node 175-1 in network 151.

In step 605, the communications distribution function 150 maintains a second pseudowire 182 that also terminates at multi-service edge node 175-1.

In step 610, based on feedback 190, the communications distribution function 150 balances establishment of different communication sessions associated with each new customer via assignment of new customer sessions to pseudowire 181 and pseudowire 182.

Figure 7:
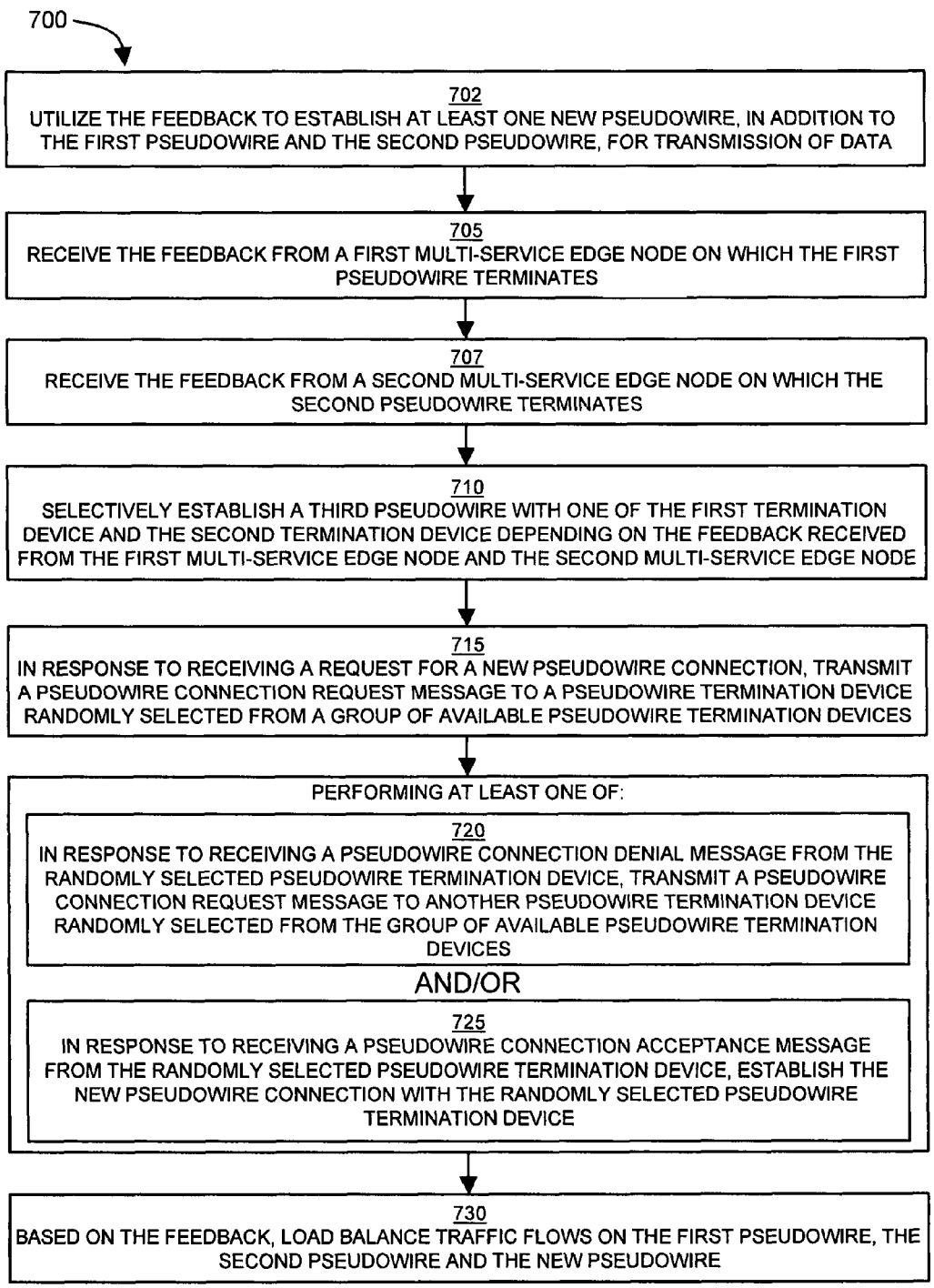
FIG. 7 is a flow chart of example processing steps performed by the communications distribution process according to embodiments herein.

FIG. 7 is a flow chart 700 of example processing steps performed by the communications distribution function 150 illustrating the establishment of a new pseudowire connection in accordance with embodiments herein.

In step 702, the communications distribution function 150 utilizes the feedback data 190 to establish at least one new pseudowire (e.g., pseudowire 184 as shown in FIG. 2), in addition to currently established pseudowire 181, pseudowire 182 and pseudowire 183, for transmission of data traffic through network 151.

In steps 705 and 707, the communications distribution function 150 receives the feedback data 190 from multi-service edge nodes 175.

In step 710, based on the feedback 190, the communications distribution function 150 selectively establishes a new pseudowire 184 with one of the multi-service edge nodes 175. In one example embodiment, the multi-service edge nodes 175 send intermittent and/or periodic LDP status messages to the targeted LDP sessions that are open on each end of a respective pseudowire. The LDP status messages can contain the feedback data 190 for determining on which multi-service edge node 175 the new pseudowire 184 connection will be established.

For example, in one embodiment the communications distribution function 150 establishes a new pseudowire connection (e.g., pseudowire 184) from multi-service access node 164 to multi-service edge node 175-2 because the feedback data 190 indicates optimal network performance (e.g., based on bandwidth parameters, processing load parameters, etc.) associated with multi-service edge node 175-2 over multi-service edge node 175-1.

In step 715, in response to receiving a request for a new pseudowire connection, the communications distribution function 150 transmits a pseudowire connection request message to a pseudowire termination device randomly selected from a group of available pseudowire termination devices (e.g., multi-service edge nodes 175). The request for a new pseudowire connection request can be initiated by the communications distribution function 150 or other suitable source in network environment 100. In one embodiment the communications distribution function 150 randomly selects multi-service edge node 175-1 out of the group of the destination termination devices for transmission of the pseudowire connection request message. Typically, as in one example embodiment, the multiservice access node 164 (through execution of communications distribution function 150) uses the Pseudowire Forwarding Equivalence Class 129 ("FEC 129") single-sided signaling protocol to request and establish new pseudowire connections.

In step 720, in response to receiving a pseudowire connection denial message from the randomly selected pseudowire termination device (e.g., multi-service edge node 175-1), the communications distribution function 150 transmits a pseudowire connection request message (e.g., using the FEC 129 signaling protocol) to another pseudowire termination device (e.g., multi-service edge node 175-2) randomly selected from the listing of available pseudowire termination devices. For instance, in using the previous example, if multi-service edge node 175-1 rejects the request for a new pseudowire connection, the communications distribution function 150 transmits a pseudowire connection request message to another randomly selected termination device (e.g., multi-service edge node 175-2 in this example).

As an alternative to random retransmission of the request message in the event of a failed attempt, when the multi-service edge node 175-1 rejects the pseudowire connection message, the multi-service edge node 175-1 can release the label mapping of the pseudowire connection request with a status message of "Busy try again at IP address w.x.y.z", where "w.x.y.z" is the IP address of another multi-service edge node 175 in the group of multi-service edge nodes. In turn, the communications distribution function 150 can be redirected to another multi-service edge node in which to attempt creation of a new pseudowire.

In step 725, in response to receiving a pseudowire connection acceptance message from a corresponding multi-service edge node 175 in network 151, the communications distribution function 150 establishes the new pseudowire 184 in network 151. As shown in the example embodiment of FIG. 2, the communications distribution function 150 establishes a new pseudowire 184 with multi-service edge node 175-2 in response to receiving a pseudowire connection acceptance message.

In an alternate embodiment, a pseudowire connection acceptance message is not necessary for the establishment of a new pseudowire connection. Instead, the communications distribution function 150 can establish and maintain the new pseudowire 184 if a pseudowire rejection message is not received by a queried multiservice access node 164.

In step 730, after establishing the new pseudowire 184, the communications distribution function 150 can load balances traffic flows on the first pseudowire 181, the second pseudowire 182 and the new pseudowire (e.g., fourth pseudowire 184) based on received feedback 190 as previously discussed.

In another example embodiment, the multi-service access node 164 (in executing the communications distribution function 150) utilizes only a few pseudowires for all IP network sessions. The number of pseudowires that the multi-service access node 164 uses is a matter of local policy and depends on parameters such as, for example, the number of diverse paths that a pseudowire can take, the number of sessions per pseudowire destinations (e.g., provider edge routers) that are able to terminate, etc. In such a configuration, the communications distribution function 150 initiates sessions to multi-service edge nodes 175 and, as a matter of policy, the multi-service edge nodes 175 cannot reject the initiation of an sessions initiated by the communications distribution function 150.

Additionally, if a queried multi-service edge node 175 elects a next available destination termination device such as another multi-service edge node 175 in a termination device list, that multi-service edge node 175 transmits an LDP status message to the multi-service access node 164 indicating the next available multi-service edge node 175 in the termination device list. The LDP status message is not repeated until the elected multi-service edge node 175 decides to stop accepting more pseudowire connections. A multi-service edge node 175 can decide to stop accepting more connections because, for example, the device has reached a pseudowire limit or threshold, a timer has expired, etc. Moreover, if any of the multi-service edge nodes 175 become unavailable for an established session, the communications distribution function 150 can immediately switch to another multi-service edge node 175 to re-establish the pseudowire session that terminated.

While this invention has been particularly shown and described with references to preferred embodiments thereof, it will be understood by those skilled in the art that various changes in form and details may be made therein without departing from the spirit and scope of the present application as defined by the appended claims. Such variations are covered by the scope of this present disclosure. As such, the foregoing description of embodiments of the present application is not intended to be limiting. Rather, any limitations to the invention are presented in the following claims. Note that the different embodiments disclosed herein can be combined or utilized individually with respect to each other.

We claim:

1. A method for communicating data, the method comprising:
   maintaining at least a first pseudowire and a second pseudowire through a network to deliver data, wherein the first pseudowire and the second pseudowire originate at an originating node;
   receiving first feedback data, including a first load value, from a first multi-service edge node on which the first pseudowire terminates and second feedback data, including a second load value, from a second multi-service edge node on which the second pseudowire terminates, the first feedback data and second feedback data concerning current load conditions of the first and second pseudowires, wherein the first feedback data is received by way of the first pseudowire and the second feedback data is received by way of the second pseudowire;
   updating a traffic hash table with the first load value and the second load value;
   comparing, by the originating node, the first load value and the second load value contained in the traffic hash table; and
   selectively routing new traffic flows from the originating node to the first multi-service edge node via the first pseudowire when the second load value exceeds the first load value and routing new traffic flows from the originating node to the second multi-service edge node via the second pseudowire when the first load value exceeds the second load value,
   wherein the first multi-service edge node and the second multi-service edge node are different.

2. The method of claim 1, wherein the first multi-service edge node is at a different network location than the second multi-service edge node; and
   wherein selectively routing new traffic flows includes balancing establishment of a respective new communications session for each of multiple different customers amongst the first pseudowire and the second pseudowire.

3. The method of claim 2 further comprising at least one of:
   enabling a Point-to-Point Protocol over Ethernet (PPPoE) communications session over at least one of the first pseudowire and the second pseudowire to convey data traffic trough the network;
   enabling a Dynamic Host Configuration Protocol (DHCP) request session over at least one of the first pseudowire and the second pseudowire to convey data traffic through the network; and
   enabling a Virtual Local Area Network (VLAN) communications session over at least one of the first pseudowire and the second pseudowire to convey data traffic through the network.

4. The method of claim 2 further comprising:
   utilizing the feedback to determine on which of the first pseudowire or the second pseudowire to establish the respective new communications session.

5. The method of claim 4 further comprising:
   establishing the respective new communications session across at least one of the first pseudowire and the second pseudowire based on the determination of which pseudowire has resources to handle the respective new communications session.

6. The method of claim 1 further comprising:
utilizing the feedback data to establish at least one new pseudowire, in addition to the first pseudowire and the second pseudowire, for transmission of traffic flows through the network.

7. The method of claim 6 further comprising:
based on the feedback data, balancing transmission of the traffic flows on the first pseudowire, the second pseudowire, and the at least one new pseudowire.

8. The method of claim 1 further comprising:
selectively establishing a third pseudowire with one of the first multi-service edge node and the second multi-service edge node depending on the feedback data received from the first multi-service edge node and the second multi-service edge node.

9. The method of claim 1 further comprising:
in response to receiving a request for a new pseudowire connection, transmitting a pseudowire connection request message to a pseudowire termination device randomly selected from a group of available multi-service edge nodes; and performing at least one of:
in response to receiving a pseudowire connection denial message from the randomly selected pseudowire termination device, transmitting a pseudowire connection request message to another pseudowire termination device randomly selected from the group of available multi-service edge nodes; and
in response to receiving a pseudowire connection acceptance message from the randomly selected pseudowire termination device, establishing the new pseudowire connection with the randomly selected pseudowire termination device.

10. The method of claim 1, wherein maintaining the at least the first pseudowire and the second pseudowire includes, for each of the first pseudowire and the second pseudowire, emulating a native Layer 2 service over a packet switched network to provide a substantially transparent Layer 2 interface between endpoints of the first pseudowire and the second pseudowire in the network.

11. The method of claim 1 wherein the first feedback data or the second feedback data concerning current load conditions comprises a status message transmitted in accordance with a Label Distribution Protocol (LDP).

12. The method of claim 11 wherein the first feedback data or the second feedback data concerning current load conditions comprises:
a bandwidth parameter of a pseudowire;
a processor load parameter of a pseudowire termination node; and
a memory parameter of a pseudowire termination node.

13. The method of claim 1, wherein the first pseudowire includes data sessions of a first service and the second pseudowire includes data sessions of a second service.

14. The method of claim 1, wherein populating the traffic hash table further comprises:
populating the traffic hash table with a first bandwidth for the first pseudowire, a second bandwidth for the second pseudowire, a first processor load of the first multi-service edge node, and a second processor load of the second multi-service edge node.

15. A computerized device comprising:
a memory;
a processor;
a communications interface;
an interconnection mechanism coupling the memory, the processor and the communications interface; and
wherein the memory is encoded with a communications distribution application that when executed on the processor configures the processor to perform operations of:
maintaining at least a first pseudowire and a second pseudowire through a network, wherein the first pseudowire and the second pseudowire originate with the computerized device;
receiving first feedback data including a first load value concerning operation of the first pseudowire from a first pseudowire termination node;
receiving second feedback data including a second load value concerning operation of the second pseudowire from a second pseudowire termination node;
updating a traffic table with the first load value and the second load value;
comparing, by the computerized device, the first load value and the second load value included in the traffic data; and
apportioning allocation of new data traffic flows through the first and second pseudowires depending on a capacity of each pseudowire to handle the new data traffic flows by selecting the first pseudowire when the second load value exceeds the first load value, and selecting the second pseudowire when the first load value exceeds the second load value, wherein the first pseudowire termination node and the second pseudowire termination node are different.

16. The computerized device of claim 15,
wherein apportioning allocation of new data traffic flows includes balancing establishment of different customers' communication sessions amongst the first pseudowire and the second pseudowire.

17. A computer program product having a non-transitory computer readable medium operable to store computer program logic embodied in computer program code encoded thereon as an encoded set of processor based instructions for communications distribution comprising:
computer program code for maintaining a first pseudowire that terminates at a first pseudowire termination node a second pseudowire that terminates at a second pseudowire termination node that is at a different network location than the first pseudowire termination node;
computer program code for receiving first feedback data including a first load value concerning operation of the first pseudowire and for receiving second feedback data including a second load value concerning operation of the second pseudowire;
computer code for populating traffic hash table with the first load value and the second load value;
comparing the first load value and the second load value; and
computer program code for apportioning allocation of new data traffic flows through the first and second pseudowires depending on a capacity of each pseudowire to handle the new data traffic flows such that new data traffic flows are sent to the first pseudowire when the second load value exceeds the first load value and sent to the second pseudowire when the first load value exceeds the second load value, wherein the first pseudowire termination node and the second pseudowire termination node are different.

18. The computer program product of claim 17, further comprising:
computer program code for balancing establishment of different communication sessions amongst the first pseudowire and the second pseudowire.

* * * * *

UNITED STATES PATENT AND TRADEMARK OFFICE
CERTIFICATE OF CORRECTION

PATENT NO. : 8,009,558 B2  Page 1 of 1
APPLICATION NO. : 11/786506
DATED : August 30, 2011
INVENTOR(S) : David D. Ward et al.

It is certified that error appears in the above-identified patent and that said Letters Patent is hereby corrected as shown below:

In column 12, claim 3, line 52, before "the network;" replace "trough" with --through--.

In column 14, claim 17, line 37, after "pseudowire termination node" insert --and--.

Signed and Sealed this
Seventeenth Day of April, 2012

David J. Kappos
*Director of the United States Patent and Trademark Office*